US012591489B2

(12) United States Patent　　(10) Patent No.:　US 12,591,489 B2
Dietrich, Jr. et al.　　(45) Date of Patent: 　Mar. 31, 2026

(54) POINT-IN-TIME DATA COPY IN A DISTRIBUTED SYSTEM

(71) Applicant: INTERNATIONAL BUSINESS MACHINES CORPORATION, Armonk, NY (US)

(72) Inventors: Walter Charles Dietrich, Jr., Armonk, NY (US); Michael Patrick Shute, Stratford, CT (US); Marcelo Fernandes de Oliveira, Sorocaba (BR); Tiago Jose Adami, Centro (BR); Norberto Gasparotto Filho, Agua Verde (BR)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 18/060,184

(22) Filed: Nov. 30, 2022

(65) Prior Publication Data

US 2024/0176708 A1　　May 30, 2024

(51) Int. Cl.
*G06F 17/00* 　　 (2019.01)
*G06F 11/1446* 　　 (2026.01)

(52) U.S. Cl.
CPC ...... *G06F 11/1466* (2013.01); *G06F 11/1469* (2013.01); *G06F 2201/84* (2013.01)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS 6,618,794 B1 * 　9/2003 　Sicola ................. G06F 11/1466
　　　　　　　　　　　　　　　　 714/6.1
6,877,016 B1 　4/2005 　Hart
(Continued)

FOREIGN PATENT DOCUMENTS

EP 　　　3822762 A1 　 5/2021

OTHER PUBLICATIONS

IBM, "Active File Management," IBM.com [online], Dec. 23, 2021 [accessed on Jul. 29, 2022], 1 page, Retrieved from the Internet: <URL: https://www.ibm.com/docs/en/spectrum-scale/5.1.0?topic= overview-active-file-management>.
(Continued)

*Primary Examiner* — Hung D Le
(74) *Attorney, Agent, or Firm* — Edward J. Wixted, III

(57) ABSTRACT
Method, computer program product, and computer system are provided. A controller component verifies the state of all file sets. The controller component initiates a sub-controller component, based on successfully verifying the state of the file sets. The sub-controller component suspends write operations to all databases at the primary site computer. Based on the suspending completing without error, the sub-controller executes point-in-time copy processes for each of the databases and for application non-database files at the primary site computer. Applications using the databases and non-database files are not suspended. Based on all of the point-in-time copy processes completing without error, the sub-controller component resumes write operations to all databases at the primary site computer. The point-in-time copies are automatically sent to the secondary site computer so that the applications can operate at the secondary site computer if the primary site computer becomes unavailable.

20 Claims, 4 Drawing Sheets

(58) Field of Classification Search
CPC ....... G05B 13/00; H03M 7/30; H04N 9/8042;
G06T 9/00
See application file for complete search history.

(56) References Cited

U.S. PATENT DOCUMENTS

| 7,031,986 | B2 | | 4/2006 | Ito | |
|---|---|---|---|---|---|
| 8,620,973 | B1 | * | 12/2013 | Veeraswamy | G06F 16/128 |
| | | | | | 707/673 |
| 9,619,331 | B2 | * | 4/2017 | Blea | G06F 3/0631 |
| 10,289,690 | B1 | | 5/2019 | Bono | |
| 10,860,427 | B1 | | 12/2020 | Chakraborty | |
| 11,080,148 | B2 | | 8/2021 | Natanzon | |
| 2003/0033494 | A1 | * | 2/2003 | Fujibayashi | G06F 3/0689 |
| | | | | | 711/162 |
| 2003/0208511 | A1 | | 11/2003 | Earl | |
| 2006/0143412 | A1 | * | 6/2006 | Armangau | G06F 11/1451 |
| | | | | | 711/162 |
| 2008/0046400 | A1 | | 2/2008 | Shi | |
| 2012/0331264 | A1 | * | 12/2012 | Farrell | G06F 12/10 |
| | | | | | 711/207 |
| 2017/0031769 | A1 | * | 2/2017 | Zheng | G06F 3/065 |
| 2021/0096776 | A1 | | 4/2021 | Kim | |
| 2021/0157685 | A1 | | 5/2021 | Li | |
| 2022/0121533 | A1 | * | 4/2022 | Kumar | G06F 3/067 |
| 2023/0205757 | A1 | * | 6/2023 | Gupta | G06F 16/254 |
| | | | | | 707/703 |

OTHER PUBLICATIONS

IBM, "AFM-based Asynchronous Disaster Recovery (AFM DR),"
IBM.com [online], Dec. 23, 2021 [accessed on Jul. 29, 2022], 2
pages, Retrieved from the Internet: <URL: https://www.ibm.com/
docs/en/spectrum-scale/5.1.0?topic=overview-afm-based-asynchronous-
disaster-recovery-afm-dr>.
IBM, "Using a split mirror as a backup image, in IBM DB2 Version
10.5 Knowledge Center," IBM.com [online], Mar. 1, 2021 [accessed
on Jul. 29, 2022], 3 pages, Retrieved from the Internet: <URL:
https://www.ibm.com/docs/en/db2/10.5?topic=mirror-using-split-as-
backup-image>.
No Authors, "Method of the Database Backups by Using Split-
Mirror Copies of Logical Volumes," IP.com, May 4, 2001, 4 pages,
IP.com No. IPCOM000014607D, Retrieved from the Internet: <URL:
https://priorart.ip.com/IPCOM/000014607>.
Oracle, "Making Split Mirror Backups with RMAN," Oracle®
Database Backup and Recovery Advanced User's Guide [online],
[accessed on Jul. 29, 2022], 2 pages, Stanford.edu, Retrieved from
the Internet: <URL: https://web.stanford.edu/dept/itss/docs/oracle/
10gR2/backup.102/b14191/rcmbackp003.htm>.
Oracle, "Split Mirror Backup, from documentation related to SAP,"
SAP Database Guide [online], [accessed on Aug. 3, 2022], 4 pages,
Wayback Machine, Retrieved from the Internet: <URL: https://web.
archive.org/web/20210730114141/http:/remote-database.com/
00000577/68b72d86db13c642bb6e17b83b75f598.html>.
SAP, "Split Mirror Online Backup," SAP Help Portal [online],
[accessed on Jul. 29, 2022], 4 pages, Retrieved from the Internet:
<URL: https://help.sap.com/viewer/
3ef1b95cacbf4f77a066797285371bb9/118/en-US/
46ad6b94c5b462d1e10000000a1553f7.html>.
Wikipedia, "FlashCopy", Wikipedia, the free encyclopedia, [accessed
on Jul. 29, 2022], 2 Pages, Retrieved from the Internet: <URL:
FlashCopy>.
Wikipedia, "Snapshot (computer storage)", Wikipedia, the free
encyclopedia, [accessed on Jul. 29, 2022], 3 Pages, Retrieved from
the Internet: <URL: https://en.wikipedia.org/wiki/Snapshot_(computer_
storage)>.

* cited by examiner

100

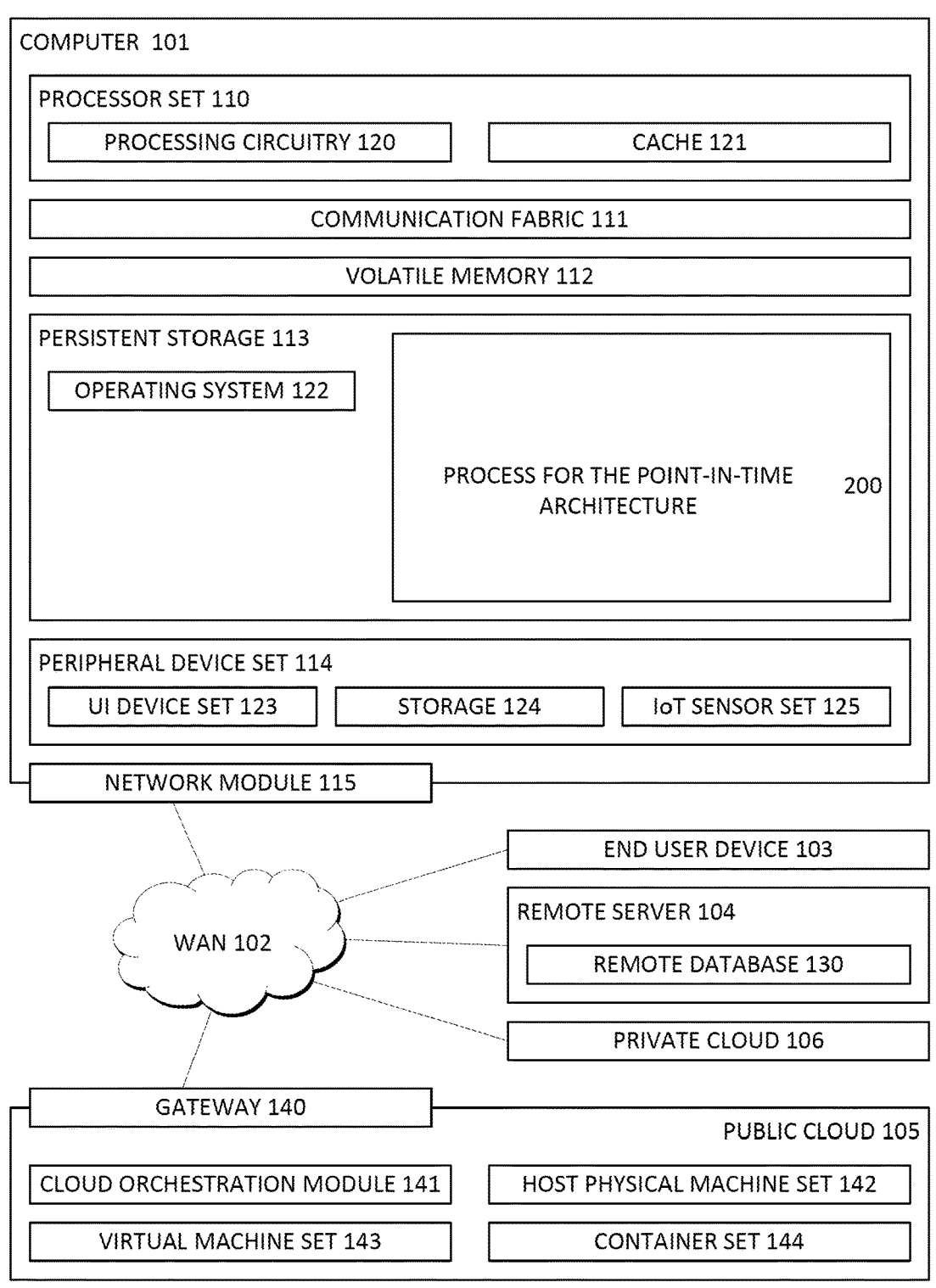

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

PROCESS FOR THE POINT-IN-TIME ARCHITECTURE    200

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

FIG. 1

POINT-IN-TIME DATA COPY IN A DISTRIBUTED SYSTEM

BACKGROUND

The present invention relates to computer systems, and more specifically to point-in-time data copy in a distributed system.

Application data can be shared between two or more sites to facilitate disaster recovery. A common practice in the Information Technology (IT) industry is to have a primary site where applications are normally run and a secondary site where applications run if the primary site becomes unavailable for some reason. Data from the primary site must be available at the secondary site in case of a failure of the primary site.

It would be advantageous to ensure a consistent version of all data is available at the secondary site in the event of a failure at the primary site.

SUMMARY

A method is provided. A controller component verifies the state of all file sets. The controller component initiates a sub-controller component, based on successfully verifying the state of the file sets. The sub-controller component suspends write operations to all databases at the primary site computer. Based on the suspending completing without error, the sub-controller executes peer snapshot processes for each of the databases and for application non-database files at the primary site computer. The applications using the databases and non-database files are not suspended in order to execute the peer snapshots. The peer snapshot copies can be executed in parallel or serially, and they effectively suspend writes by the application until they finish so that all data is consistent at the time of the copy. After the peer snapshot copy processes finish without error, each of the peer snapshots are automatically queued for transmission to a secondary site. The sub-controller component resumes write operations to all databases at the primary site computer.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 illustrates the operating environment of a computer server, according to an embodiment of the present invention;

DETAILED DESCRIPTION

Figure 2:
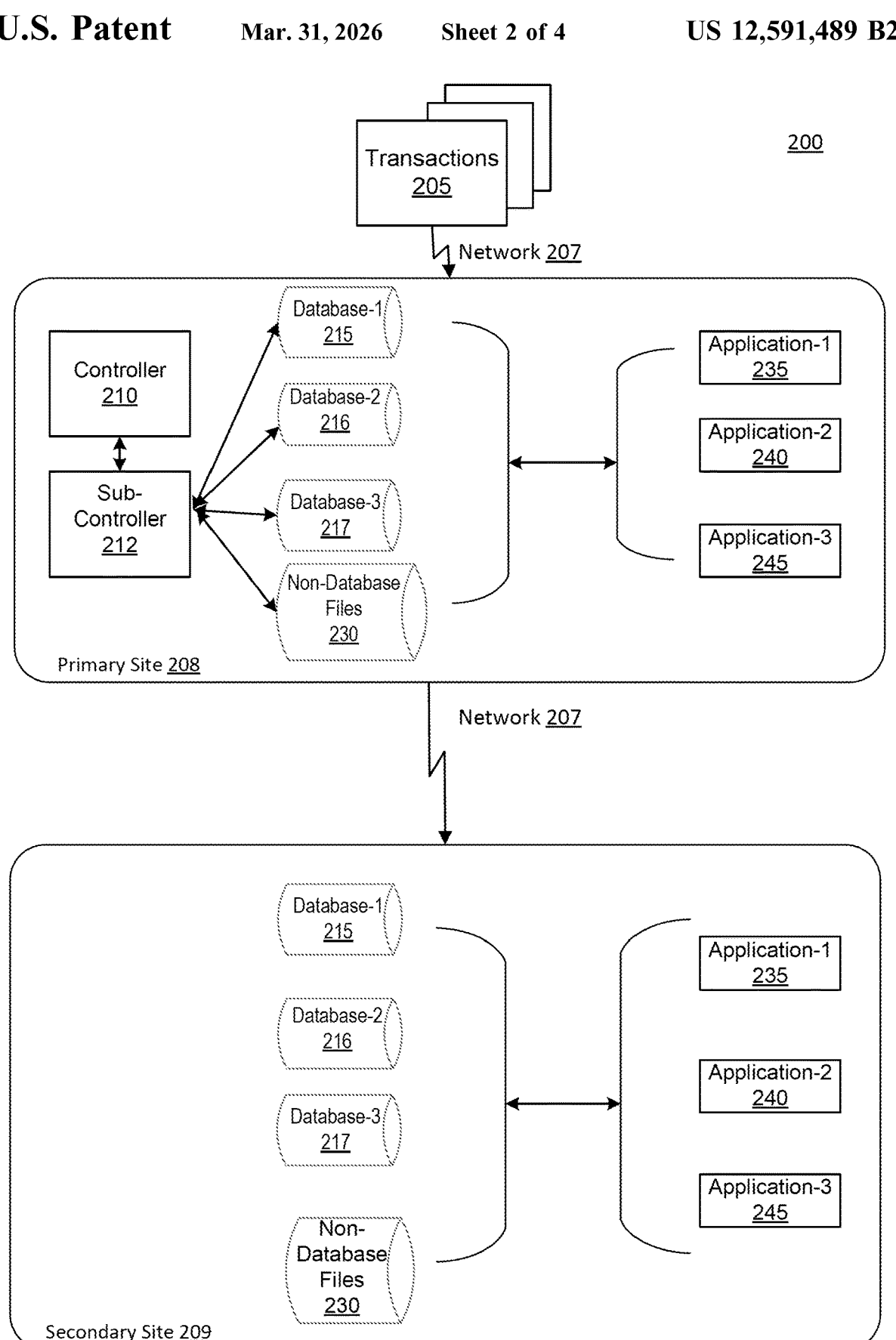
FIG. 2 illustrates an exemplary architecture for making a point-in-time copy in a distributed system, in accordance with one or more aspects of the present invention.

Application data might be shared between two or more sites to facilitate disaster recovery. A common practice in the IT industry is to have a primary site where applications are normally run and one or more secondary sites where applications run if the primary site becomes unavailable for some reason. Data from the primary site must be available at the secondary site when a failure occurs at the primary site. Optimally, data at the two sites can be continuously kept synchronized. This requires the application that is writing the data at the primary site to send the data to the secondary site, and then wait for an acknowledgement that it has been written before continuing execution. The acknowledgment is necessary because data corruption will likely occur if data is lost during the transfer, without corrective action being taken by the application.

Data synchronization can be difficult to maintain. For example, synchronously transmitting a small amount of data (such as a packet) to the secondary site can cause the application at the primary site to experience performance degradation because of the wait for an acknowledgement. Even if the wait for a small amount of data is short, the wait for a large amount of data will be long if communication bandwidth between the sites is not commensurate with the amount of data to be transmitted. Either of these conditions can affect the ability of the enterprise to meet business objectives. Further, reliable synchronous data transfer is typically limited proportionally by physical distance between sites due to the latency inherent in the data transmission.

An asynchronous distributed file system is one common alternate approach to data transfer between sites to address these shortcomings. For example, the performance of the application is not implicated since it does not have to wait for acknowledgments from the disaster recovery (DR) site. Additionally, it may be possible to architect the application to alternate between writing a large amount data per time period and writing a small amount of data per time period. In this case, the file system only has to transmit changes at the average rate rather than the peak rate, which could reduce the amount of bandwidth required. However, to be able to reliably predict the application's behavior requires developers and administrators to have a deep knowledge of the application architecture.

Asynchronous data does not guarantee how long the transfer will take between sites, nor is the order of arrival of the data guaranteed. For example, consider an application that writes file A to disk, waits for the system to finish writing the file to disk, writes file B to disk, and waits for the system to finish writing file B to disk. Most software is written with an assumption that if file B is available, file A is also available. In a distributed asynchronous file system, file B might be available at the secondary site before file A. If that is not the case, there can be data integrity issues. For example, if file A represents a deposit of $100 and file B represents a withdrawal of $100, then if the order of writing is preserved, an erroneous negative result is avoided. Therefore, when used for DR, the data at the DR site might not be as up to date as the data at the primary site, but if the data is reasonably up to date, the data may meet the requirements of most applications. If there is not a need to use the secondary site, for example the secondary site is not architected as part of a DR solution, the order of arrival of the asynchronous writes is not as important. If there is a need to use the secondary site, the inconsistency between the files can cause application errors.

As a further example, prior to this invention, a subject application comprises two or more independent databases from one or more data base management system (DBMS) vendors. The application requires a large number of non-database files (in one case, approximately three million). Snapshots of the databases are taken, followed by snapshots of the non-database files. Because of the delay between the database snapshots and the non-database files, data in the databases and files were not synchronized, and any discrepancies in the data were manually reconciled. Also, database snapshots that were not taken simultaneously, could be inconsistent with each other.

The application's business data is typically stored in a DBMS of some type (i.e., relational, hierarchical, object-oriented) in the form of tables and indexes. Non-database application data may include the application's data files, and its configuration and log files. Database instance files include the files, structures, and functionality provided by the DBMS vendor to instantiate the database, as well as the configuration and log files created as a result of activating the database. The time to back up a database is typically proportional to the amount of data in the databases and can take several hours. To minimize the time spent in making the backup, some DBMSs provide a functionality known as split mirror that is designed for use with a storage area network (SAN) or operating system to take snapshots of sets of files. A snapshot is a read-only copy of a set of files taken at a particular point in time. In its most simple, but unscalable implementation, a snapshot literally is a copying of all the files in the set. Other implementations are possible, such as using a scheme that gives the appearance to the operating system and/or application of performing the copy, but actually delaying the copying until a file is changed.

A snapshot can be converted into a writeable copy if an application or database problem arises that requires reverting to a previous version of the data. The DBMS can be started using commands that are appropriate for a copy of data that was made as part of a split mirror, and applications can use the data as they normally would.

A drawback to a conventional snapshot solution is that it only applies to applications whose databases are on one server or on one SAN. If an application also executes at the secondary site, the snapshot is available at the primary site, but not at the secondary site so that data will not be synchronized. Distributed file systems that include the ability to take and use snapshots and then automatically replicate data from one site to another site can help in this situation. However, if an application architecture includes several different applications that are integrated to provide their functionality (e.g., enterprise resource planning (ERP), customer relationship management (CRM), human capital management (HCM)), it is possible that each different application is supplied by a different vendor, and therefore can use a different DBMS or a combination of DBMSs and non-database files, for example, Oracle®, DB2®, and sequential files. In this case, a discrete backup/recovery solution is required for each application, operationally complicating application maintenance. Oracle® is a registered trademark of Oracle and/or its affiliates. DB2® is a registered trademark of IBM in the United States.

Embodiments of the present invention address the drawbacks currently existing in the art by providing a process to ensure that if a secondary site is used, a consistent version of all the data is available in the event of a disaster. The various embodiments combine the functionality provided by different DBMS architectures, along with features of distributed file systems to make available a coherent snapshot backup/recovery solution. We refer to snapshots that are automatically replicated to other sites as "peer snapshots" in order to distinguish them from traditional snapshots.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Beginning now with FIG. 1, an illustration is presented of the operating environment of a networked computer, according to an embodiment of the present invention.

Computing environment 100 contains an example of an environment for the execution of at least some of the computer code involved in performing the inventive methods, such an architecture for making a point-in-time copy in a distributed system (architecture) 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, an administrator that operates computer 101), and may take any of the forms discussed above in connection with computer 101. For example, EUD 103 can be the external application by which an end user connects to the control node through WAN 102. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 illustrates components of an exemplary architecture for making a point-in-time copy in a distributed system (architecture) 200.

As shown, the architecture 200 includes at least two sites, a primary site 208 and at least one secondary site 209. The sites are connected to each other via network 207.

The primary site 208 illustrates an ecosystem for receiving and processing the transactions 205 that are received from any number of entities (not shown) that subscribe to the services of the applications (235, 240, 245) at the primary site 208. Although three applications are shown, the architecture 200 supports more or fewer applications. The applications application-1 235, application-2, 240, and application-3 245 are typically independent from each other, each application having a defined set of transactions 205 to which it responds. The applications read and write their transaction results to one of the databases, database-1 215, database-2 216, database-3 217, based on the design of the particular application. All of the applications write to the non-database files 230. These are used to store data files as well as miscellaneous files, such as logs and configuration data. It is possible that each different application can use a different database or a combination of databases and non-database files, for example, Oracle®, DB2®. Although three databases are shown, the architecture 200 can support more or fewer databases, depending on the architecture of the applications. Alternatively, an application can store its data primarily in non-database files 230 rather than, or in combination with, a database.

The operations of the architecture 200 are controlled by a controller 210 and a sub-controller 212 on the primary site 208. The controller 210 and sub-controller 212 cooperate to direct the creation of the point-in-time copies, referred to as peer snapshots. In the case of the failure, the secondary site 209 is activated using the recently transmitted peer snapshots so that the data at the secondary site meets the applications' needs with respect to consistency and integrity.

At the primary site 208, the databases and the non-database files are configured to use file systems that support peer snapshots and that are mirrored to the secondary site 209. The databases are configured so that writing can be suspended and resumed. This database capability is sometimes referred to as a "split mirror" capability. The enterprise can develop and configure its own propriety distributed file system. However, IBM Spectrum Storage Suite®, and similar storage products, are available to provide the needed functionality.

Of further note, the applications 235, 240, and 245 and the databases 215, 216, 217 and the non-database files 230 may reside on a combination of one or more computer server or may reside on the same computer server. One skilled in the art of data replication would appreciate that network connectivity among the components of the architecture 200 is an important consideration to ensure meeting application performance commitments.

Figure 3:
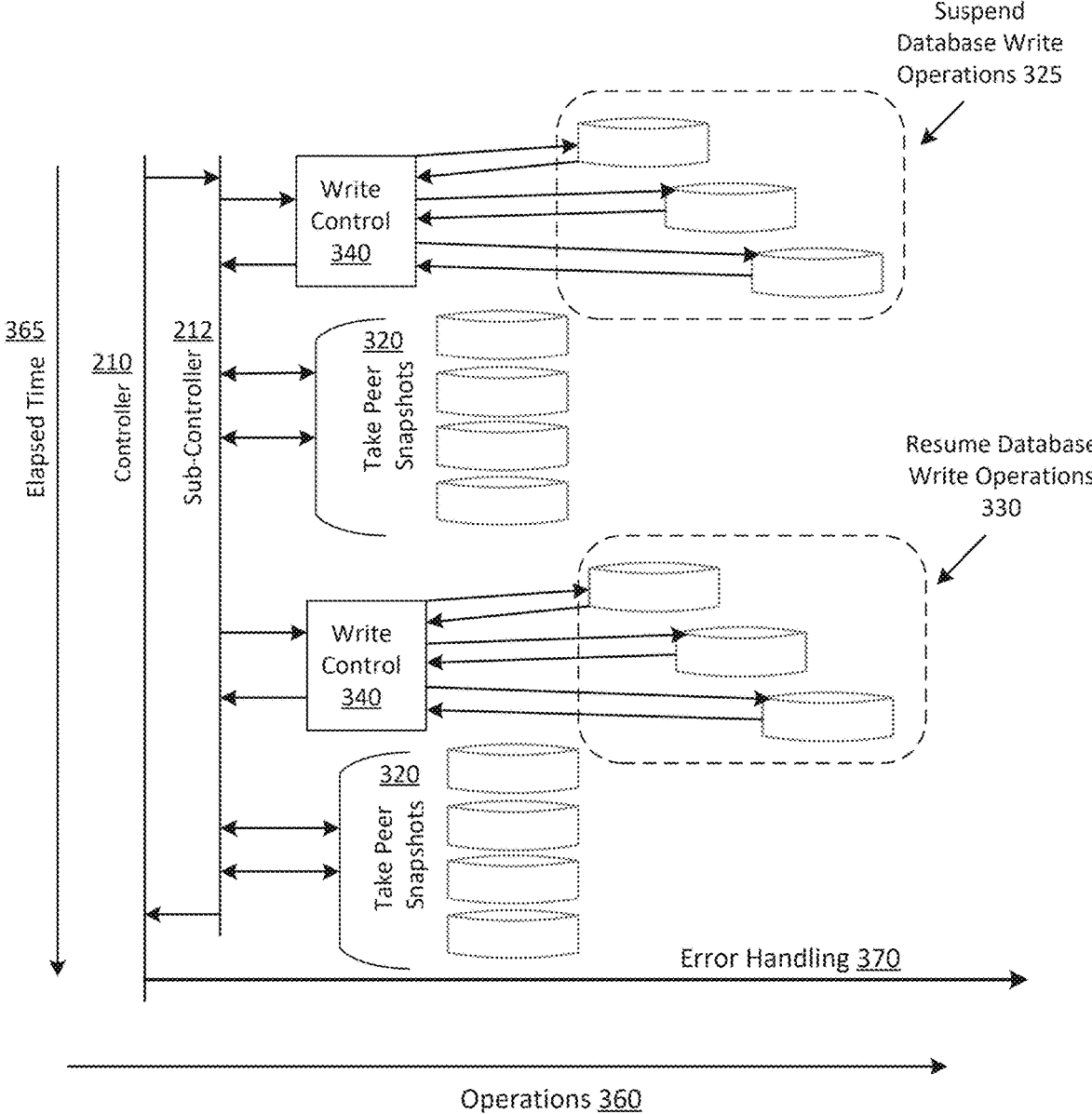
FIG. 3 illustrates a process flow for generating a point-in-time copy of data in a distributed environment, in accordance with one or more aspects of the present invention.

FIG. 3 illustrates a process flow for generating a point-in-time copy of data in a distributed environment, where the architecture 200 includes a controller 210 and a sub-controller 212. The processes are shown along the operations 360 indicator, and the sequence of the operations is shown along elapsed time 365.

The controller 210 executes periodically according to a configurable schedule and initiates the point-in-time copy process. The controller 210 verifies that all of the non-database files 230 and the databases 215, 216, 217 on the servers at the primary site 208 are available. Here, available means that no point-in-time copies are queued or executing, and no database backups or restores are in process. The controller 210 also verifies that distributed file system is operating normally. This can be done by inspecting the status of the distributed file system, using a command or similar function call to the distributed file system. The received output of the command can be formatted, for example in a table, showing each file set in the file system and its status. A status of "active," "dirty," or similar, indicates the distributed file system is operating normally. A negative, error, or no response, may indicate that the distributed file system is not operating normally.

If any of the verifications fail, the controller 210 can retry on a configurable interval, such as five minutes up to a configurable number of retry attempts. The controller might terminate and alert at least an error handler if the verification continues to fail. Typical error handling may be configurable, to include messaging support or system administrators and writing the error to a log file for diagnostics. Additionally, the controller 210 monitors the progress of the operations of the sub-controller 212 and can message the sub-controller 212 to terminate/retry a process if a return code indicating success is not received at the controller 210 within a configurable threshold of time.

After the verifications are successfully completed, the controller 210 starts the sub-controller 212, which handles normal operations. The sub-controller 212 operates in several phases, each of which must succeed before passing on to the next phase.

The write control 340 component of the sub-controller 212 suspends all write activity to the databases (at 325) on the primary site 208.

At 320, while writes to the databases are suspended, the sub-controller 212 initiates peer snapshots of the database data and logs. The peer snapshots are created for each application's database(s), even where the database products are of different architectures or vendors. The peer snapshot processes can be executed in parallel or sequentially. Upon completion, the peer snapshots of the database data are automatically queued for asynchronous transmission to the secondary site 209. This transmission may begin immediately or be delayed, depending on various factors such as workload priority parameters and network performance goals.

With the writes to the databases still suspended, the sub-controller 212 initiates peer snapshots of the applications' non-database files 230. These files include input and/or output data, for example bank statements or inventory records. The files can be organized into one or more file sets. Application writes are briefly suspended for the duration of each peer snapshot of an application data file set. After the completion of each application data file set peer snapshot, writes are resumed to that application data file set, and the peer snapshot is automatically queued for asynchronous transmission to the secondary site 209. This transmission may begin immediately or be delayed, depending on various factors such as workload priority parameters and network performance goals.

Unlike current art, the present invention does not require that the applications be stopped while the peer snapshots are created. Application read operations will continue without interruption during the peer snapshot processes. Typically, applications are written to include error handling and retry processes, and the distributed file systems are typically tuned to successfully communicate over large distances. Additionally, the sub-controller 212 can be configured to retry a peer snapshot process that returns an error condition. As a result, data sources are homogenized and kept in sync when needed for a recovery operation on the secondary site 209.

Following the creation of the database peer snapshots and the peer snapshots for the application file sets the write control 340 component of the sub-controller 212 resumes all write activity to the databases (at 330) on the primary site 208. Alternatively, as shown in FIG. 3, to increase performance and responsiveness of the applications, write activity to the databases can be resumed (at 330), and then the peer snapshots can be created of the various non-database files 230.

Figure 4:
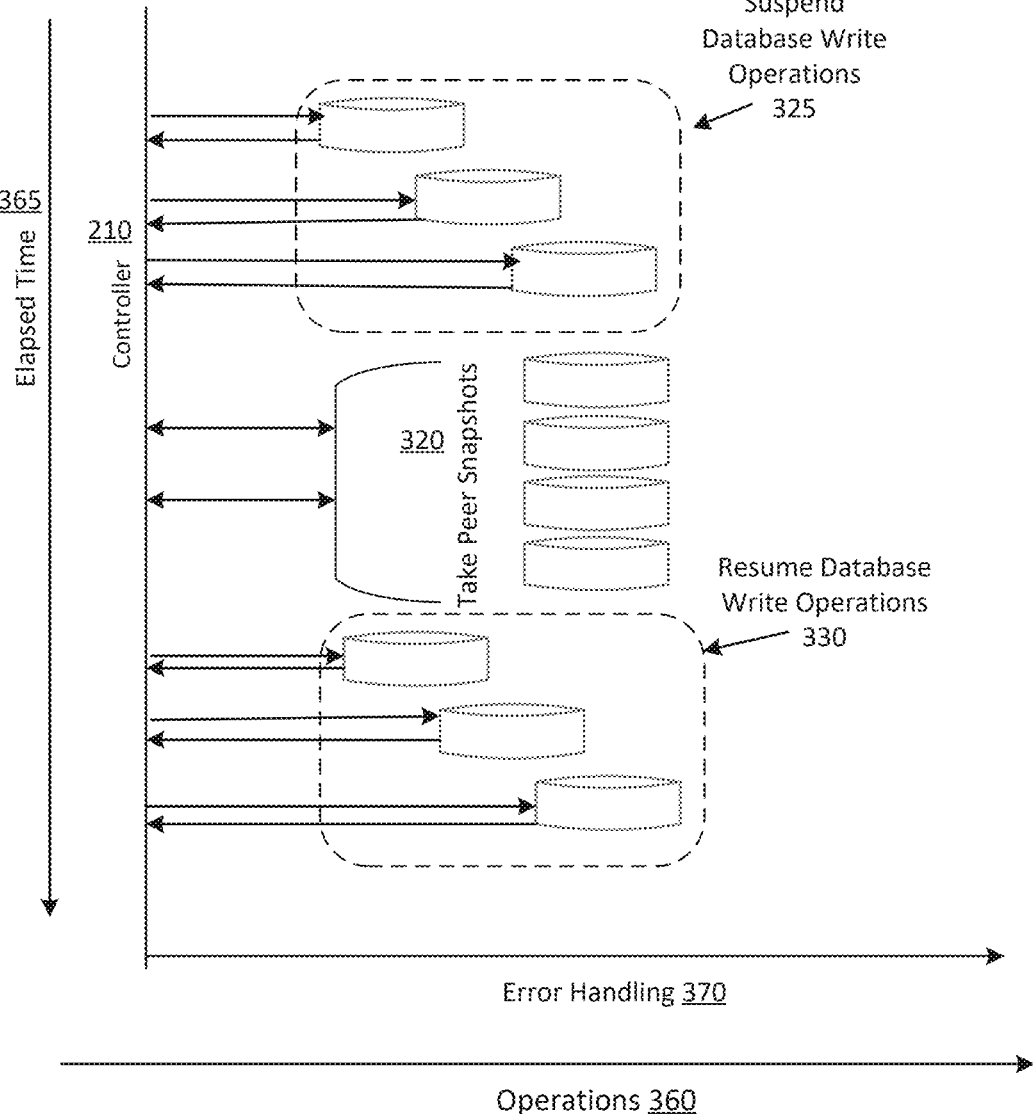
FIG. 4 illustrates an alternate process flow for generating a point-in-time copy of data in a distributed environment, in accordance with one or more aspects of the present invention.

If the controller 210 does not receive a return code from the sub-controller 212 that the database writes have resumed, the controller 210 performs error handling 370 and cleanup of the failed processes. This may include logging any errors and alerting system administrators. The controller 210 can attempt to query the status of each database directly and attempt to resume writing on a database that shows a suspended status. To avoid confusion and to ensure there is either a complete set or no set of peer snapshots, the controller 210 can delete all the new peer snapshots from the failed peer snapshot iteration. FIG. 4 illustrates an alternate process flow for generating a point-in-time copy of data in a distributed environment. Elements in FIG. 4 perform substantially the same function as those similarly labeled in FIG. 3. In this embodiment, the controller 210 performs the operations of the controller 210 and of the sub-controller 212 because the sub-controller 212 is not architected in the configuration. The functions remain the same as depicted in FIG. 3.

What is claimed is:

1. A method, comprising:

verifying, by a controller component, a state of all file sets;

based on receiving an indicator of successful verifying to the controller component, the controller component initiating a sub-controller component;

suspending, by the sub-controller component, write operations to all databases at a primary site computer;

based on the suspending completing without error, the sub-controller executing peer snapshot processes for each of the databases and for application non-database files at the primary site computer, and wherein applications using the databases and non-database files are not suspended;

based on all of the peer snapshot processes completing without error, automatically queuing each of the peer snapshots for transmission to a secondary site; and the sub-controller component resuming write operations to all databases at the primary site computer.

2. The method of claim 1, wherein the verifying further comprises:

checking processes on the primary site computer for queued or executing point-in-time copy processes;

checking processes on the primary site computer for queued or executing database backup processes or database restore processes; and based on no queued or executing processes being found, returning the indicator of successful verifying to the controller component.

3. The method of claim 1, wherein the databases comprise a combination of one or more different vendors and one or more different architectures.

4. The method of claim 1, wherein the controller component executes all functions, and wherein the sub-controller component is not configured.

5. The method of claim 1, wherein based on all of the point-in-time copy processes completing without error, asynchronously making all the snapshots available at a secondary site.

6. The method of claim 1, wherein:

based on at least one of the point-in-time copy processes or any of the requests to suspend write operations failing to complete within a configurable time, retrying, by the sub-controller component, the failing operation a configurable amount of times; and based on the retried operation not succeeding, returning control to the controller component with an error indicating the failed operation.

7. The method of claim 1, further comprising:

in response to the controller component receiving from the sub-controller component an error condition indicating write operations to the databases is not resumed, the controller component attempting to resume write operations at the databases; and deleting the point-in-time copies.

8. A computer program product, the computer program product comprising a non-transitory tangible storage device having program code embodied therewith, the program code executable by a processor of a computer to perform a method, the method comprising:

verifying, by a controller component, a state of all file sets;

based on receiving an indicator of successful verifying to the controller component, the controller component initiating a sub-controller component;

suspending, by the sub-controller component, write operations to all databases at a primary site computer;

based on the suspending completing without error, the sub-controller executing peer snapshot processes for each of the databases and for application non-database files at the primary site computer, and wherein applications using the databases and non-database files are not suspended;

based on all of the point-in-time copy processes completing without error, automatically queuing each of the peer snapshots for transmission to a secondary site; and the sub-controller component resuming write operations to all databases at the primary site computer.

9. The computer program product of claim 8, wherein the verifying further comprises:

checking processes on the primary site computer for queued or executing point-in-time copy processes;

checking processes on the primary site computer for queued or executing database backup processes or database restore processes; and based on no queued or executing processes being found, returning the indicator of successful verifying to the controller component.

10. The computer program product of claim 8, wherein the databases comprise a combination of one or more different vendors and one or more different architectures.

11. The computer program product of claim 8, wherein the controller component executes all functions, and wherein the sub-controller component is not configured.

12. The computer program product of claim 8, wherein based on all of the point-in-time copy processes completing without error, asynchronously making all the snapshots available at a secondary site.

13. The computer program product of claim 8, wherein:

based on at least one of the point-in-time copy processes or any of the requests to suspend write operations failing to complete within a configurable time, retrying, by the sub-controller component, the failing operation a configurable amount of times; and based on the retried operation not succeeding, returning control to the controller component with an error indicating the failed operation.

14. The computer program product of claim 8, further comprising:

in response to the controller component receiving from the sub-controller component an error condition indicating write operations to the databases is not resumed, the controller component attempting to resume write operations at the databases; and deleting the point-in-time copies.

15. A computer system, comprising:

one or more processors;

a memory coupled to at least one of the processors;

a set of computer program instructions stored in the memory and executed by at least one of the processors in order to perform actions of:

verifying, by a controller component, a state of all file sets;

based on receiving an indicator of successful verifying to the controller component, the controller component initiating a sub-controller component;

suspending, by the sub-controller component, write operations to all databases at a primary site computer;

based on the suspending completing without error, the sub-controller executing peer snapshot processes for each of the databases and for application non-database files at the primary site computer, and wherein applications using the databases and non-database files are not suspended;

based on all of the peer snapshot processes completing without error, automatically queuing each of the peer snapshots for transmission to a secondary site; and based on all of the point-in-time copy processes completing without error, the sub-controller component resuming write operations to all databases at the primary site computer.

16. The computer system of claim 15, wherein the verifying further comprises:

checking processes on the primary site computer for queued or executing point-in-time copy processes;

checking processes on the primary site computer for queued or executing database backup processes or database restore processes; and based on no queued or executing processes being found, returning the indicator of successful verifying to the controller component.

17. The computer system of claim 15, wherein the databases comprise a combination of one or more different vendors and one or more different architectures.

18. The computer system of claim 15, wherein the controller component executes all functions, and wherein the sub-controller component is not configured.

19. The computer system of claim 15, wherein:

based on at least one of the point-in-time copy processes or any of the requests to suspend write operations failing to complete within a configurable time, retrying, by the sub-controller component, the failing operation a configurable amount of times; and based on the retried operation not succeeding, returning control to the controller component with an error indicating the failed operation.

20. The computer system of claim 15, further comprising:

in response to the controller component receiving from the sub-controller component an error condition indicating write operations to the databases is not resumed, the controller component attempting to resume write operations at the databases; and deleting the point-in-time copies.

* * * * *